United States Patent
Demouzon et al.

[19]
[11] Patent Number: 5,871,175
[45] Date of Patent: Feb. 16, 1999

[54] REDUNDANT FRONT SUSPENSION SYSTEM FOR A TURBOSHAFT ENGINE

[75] Inventors: Francis Michel Demouzon, Cesson; Rene Pierre Fer, Dammarie Les Lys; Patrick Jean Alibert Huet, Lisses; Laurent Pierre Elysée Gaston Marnas, Vaux Le Penil, all of France

[73] Assignee: Societe Nationale D'etude et de Construction de Moteurs D'Aviation, Paris, France

[21] Appl. No.: 974,423

[22] Filed: Nov. 19, 1997

[30] Foreign Application Priority Data

Nov. 21, 1996 [FR] France ................................. 96 14189

[51] Int. Cl.[6] ................................................. B64D 27/26
[52] U.S. Cl. ........................... 244/54; 248/554; 60/39.31
[58] Field of Search ........................... 244/55, 54, 53 R; 248/554–557; 60/39.31

[56] References Cited

U.S. PATENT DOCUMENTS

| | | | |
|---|---|---|---|
| 3,907,220 | 9/1975 | Amelio | 244/54 |
| 4,065,077 | 12/1977 | Brooks . | |
| 4,560,122 | 12/1985 | Parkinson et al. | 244/54 |
| 5,303,880 | 4/1994 | Cencula et al. | 244/54 |
| 5,474,258 | 12/1995 | Taylor et al. | 244/54 |

FOREIGN PATENT DOCUMENTS

| | | |
|---|---|---|
| 2217549 | 9/1974 | France . |
| 2 599 708 | 12/1987 | France . |
| 2 680 353 | 2/1993 | France . |

*Primary Examiner*—Galen L. Barefoot
*Attorney, Agent, or Firm*—Oblon, Spivak, McCleeland, Maier & Neustadt, P.C.

[57] ABSTRACT

A redundant front suspension system for a turboshaft engine mounted on a pylon of an aircraft comprises a primary suspension device forming the normal front suspension of the engine, and an emergency suspension device which operates in the event of failure of the normal suspension. The primary suspension device comprises a base support which is fixed to the pylon and has a suspension shaft which co-operates with the intermediate casing of the engine. Thrust take-up rods connect the intermediate casing to the base support. The emergency suspension device comprises a first support secured to the pylon and a second support secured to the intermediate casing, each of these two supports having a vertical yoke associated with it. The vertical yokes are interconnected by a connecting rod in a manner which provides a clearance between the rod and at least one of the yokes. The second support carries a vertical pin which is received with clearance in a bore in a horizontal yoke provided on the first support, the vertical pin and the horizontal yoke taking up the longitudinal and transverse forces in the event of a failure of the normal suspension shaft or of a thrust take-up rod. The connecting rod takes up the vertical forces in the event of a failure of the normal suspension shaft.

6 Claims, 8 Drawing Sheets

REDUNDANT FRONT SUSPENSION SYSTEM FOR A TURBOSHAFT ENGINE

BACKGROUND OF THE INVENTION

1. Field of the invention

The invention relates to a redundant front suspension system for a turboshaft engine mounted on a pylon carried by an aircraft, the word "front" being defined with respect to the direction of flow through the engine to denote that part of the engine which is remote from the flow exhaust zone.

2. Summary of the invention

As is known, an aircraft turboshaft engine is attached to a pylon by means of a front suspension device and a rear suspension device such that the pylon can effect mechanical transmission of the forces between the engine and the aircraft structure. These suspension devices have to withstand the mechanical forces acting along the vertical axis Z due to the weight of the engine, and the dynamic forces acting along the transverse axis Y caused by the movements of the aircraft. The loads produced by the engine thrust and directed along the longitudinal axis X are transmitted to one of the suspension devices by inclined thrust take-up rods disposed on either side of the engine.

Also, for obvious safety reasons the suspension of the turboshaft engine must possess redundancy. For this purpose there are two possible solutions. One is to duplicate all the components of the suspension so that each is adapted to withstand the fixed forces by itself, and the other is to add stand-by components which are arranged to withstand the forces only in the event of a failure of the main suspension.

FR-A-2 680 353 discloses a rear connection structure for attaching a turbojet engine to a pylon wherein a mounting is secured to the pylon and is connected to the engine exhaust casing by three suspension rods, the mounting comprising two parts which are fitted one in the other and which are dimensioned such that each is able to take up all the forces transmitted between the casing and the pylon.

FR-A-2 599 708 also discloses a rear connection device for a turbojet engine, wherein there is provided, in addition to the three known rods, a fourth safety rod which does not take up any loads under normal conditions.

Both of these documents relate only to the rear suspension, and make no reference to means for taking up the considerable X-axis thrust loads in the event of failure of a thrust take-up rod or of the suspension means which normally deals with the load of such rods.

SUMMARY OF THE INVENTION

It is an object of the invention to provide a redundant front suspension system for a turboshaft engine mounted on a pylon wherein the normal front suspension is provided with stand-by components adapted to take-up the forces acting along one or more of the X, Y and Z-axes in the event of a failure of the normal suspension.

Accordingly the invention provides a redundant front suspension system for a turboshaft engine mounted on a pylon carried by an aircraft, said suspension system comprising a primary suspension device which functions as the normal front suspension of said engine, and an emergency suspension device which operates only in the event of a failure of said normal front suspension, said primary suspension device comprising a base support which is secured to said pylon and is connected to the intermediate casing of said turboshaft engine, and thrust take-up rods which are interposed between said base support and said engine, said base support being adapted to provide mechanical transmission of the forces acting along a transverse axis Y and a vertical axis Z between said intermediate casing and said pylon as well as transmission to said pylon of the engine thrust forces which act along a longitudinal axis X and which are transmitted by said thrust take-up rods, and said emergency suspension device comprising a first support which is fixed to said pylon and has a horizontal yoke adapted to take up the X and Y-axes forces, a first vertical yoke which is fixed to said pylon and is adapted to take-up the Z-axis forces, a second support which is secured to said intermediate casing of said engine and which has a second vertical yoke adapted to take up said Z-axis forces and a vertical pin adapted to take up said X and Y-axis forces, and a connecting rod having a first end connected to said first vertical yoke and a second end connected to said second vertical yoke, the connection between said connecting rod and one of said first and second vertical yokes being provided with a clearance, and said horizontal yoke of said first support having a bore in which said vertical pin of said second support is received with a clearance.

In normal operation only the base support takes up the forces and loads transmitted between the engine and the pylon. This is because the second support is mechanically isolated from the first support and the pylon as a result of the clearance between the vertical pin and the bore in the horizontal yoke and the clearance in the connection of the rod to one or other of the first and second vertical yokes.

Preferably the first vertical yoke is disposed above the horizontal yoke of the first support, and the second vertical yoke on the second support is disposed forwardly of the vertical pin.

Preferably the second vertical yoke on the second support comprises two lugs which are disposed on opposite sides of the second end of the connecting rod and forwardly of the horizontal yoke of the first support.

Other preferred features and advantages of the invention will become apparent from the following description of a preferred embodiment with reference to the accompanying drawings.

DESCRIPTION OF THE PREFERRED EMBODIMENT

Figure 1:
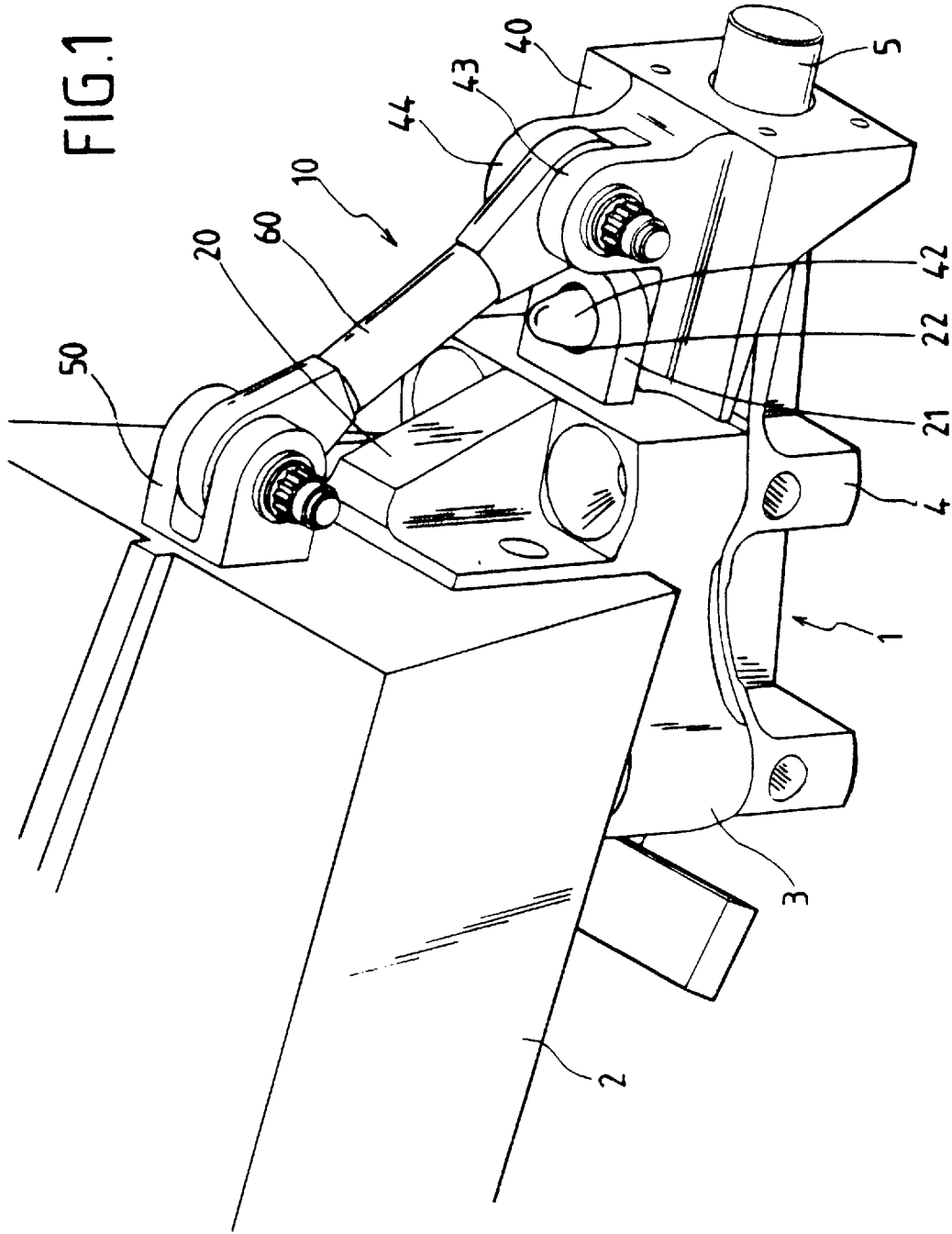
FIG. 1 is a perspective view of a preferred embodiment of the redundant front suspension system in accordance with the invention, the drawing showing a portion of an aircraft pylon to which the system is attached but not showing any of the turboshaft engine for the sake of clarity.

FIG. 1 shows a redundant front suspension system 1 for mounting a turboshaft engine on the pylon 2 of an aircraft. The engine is not shown for the sake of clarity, but it is sufficient to know that the front suspension point of the engine is located on the intermediate casing thereof.

Figure 3:
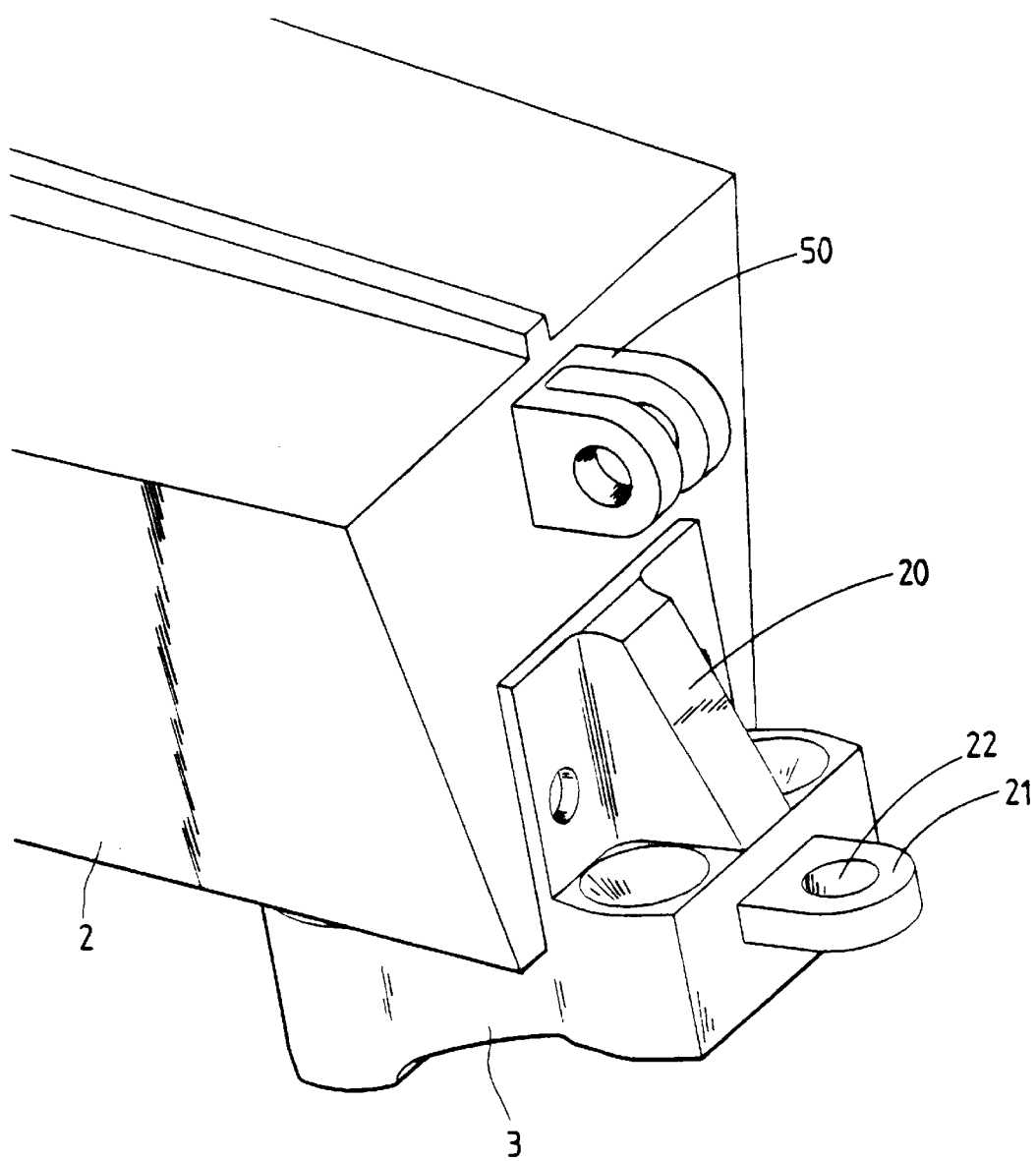
FIG. 3 is a perspective view showing part of the aircraft pylon and those elements of the emergency suspension device which are fixed to the pylon.
Figure 4:
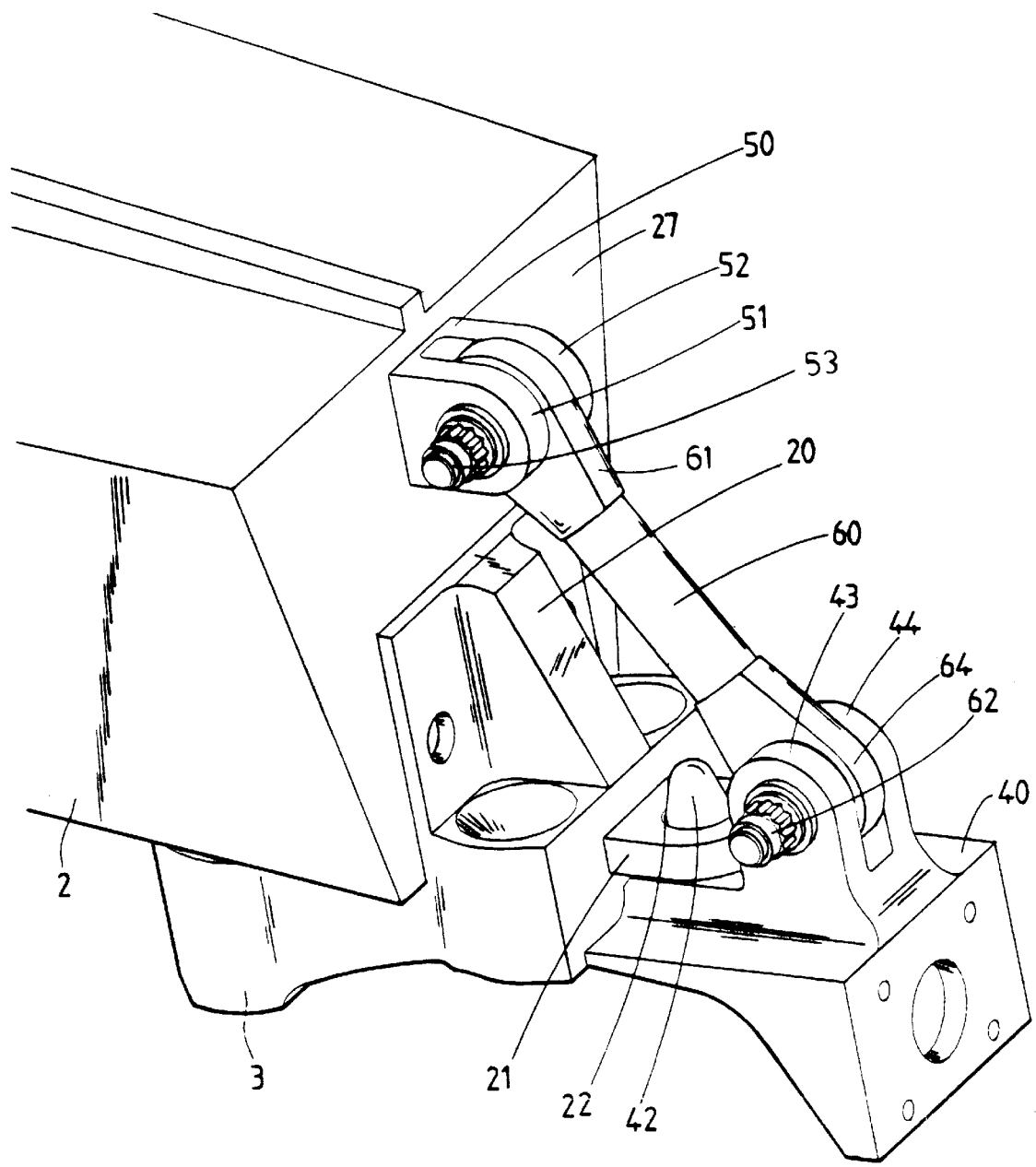
FIG. 4 is a view similar to FIG. 3 but showing the whole of the emergency suspension device.
Figure 5:
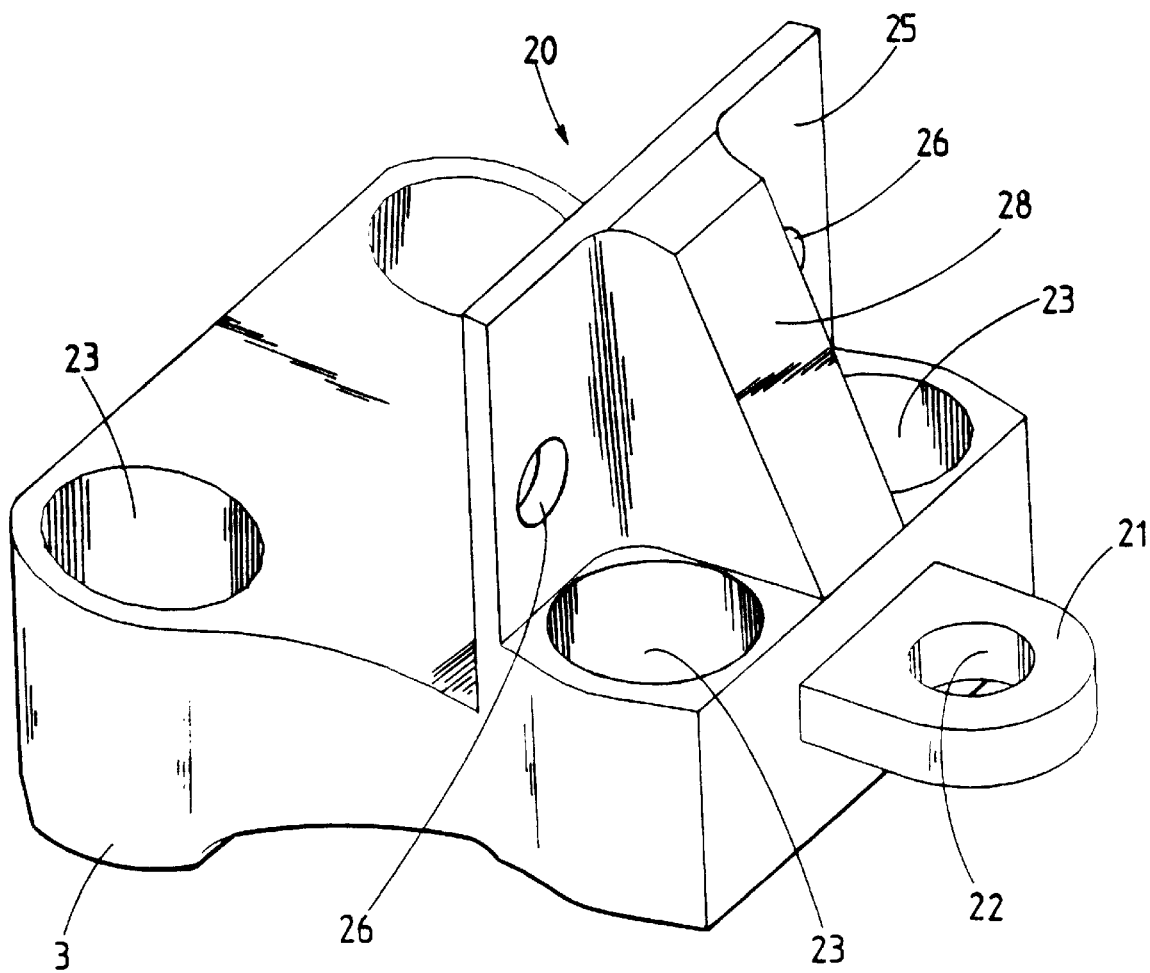
FIG. 5 is a perspective view of just the first support of the emergency suspension device.

The pylon 2 is fitted with a heel 3 for the attachment of the suspension system 1 to the pylon, as is shown in FIG. 1, 3 and 4.

Figure 2:
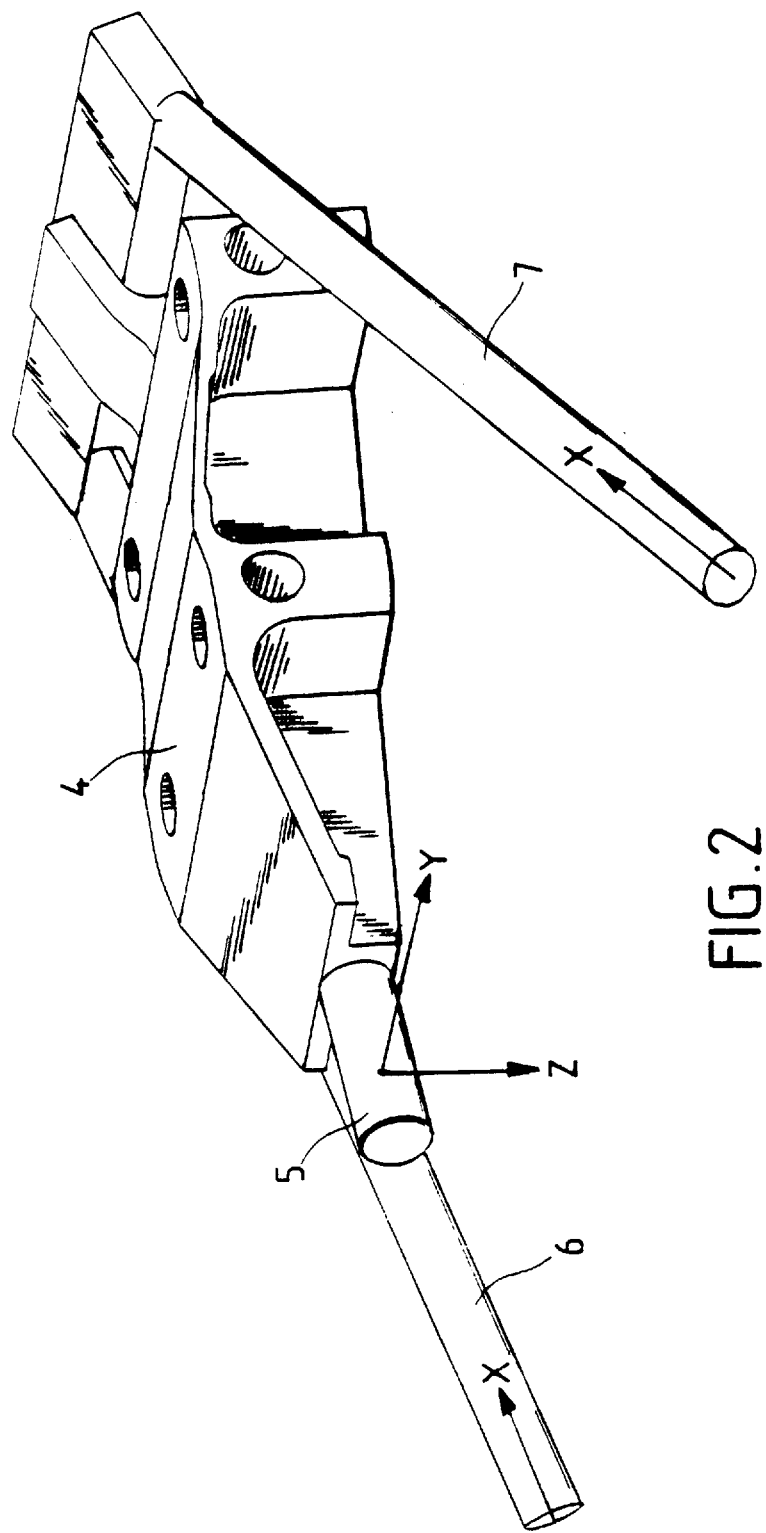
FIG. 2 is a perspective view of the primary suspension device of the system shown in FIG. 1 and including the thrust take-up rods.

The suspension system 1 includes a primary suspension device which forms the normal front suspension of the turboshaft engine and which comprises a base support 4 as shown in FIGS. 1 and 2. The base support 4 is fixed under the heel 3, and extends towards the front of the aircraft in the direction of flight As its front end the base support 4 has a support shaft 5 which extends forwardly in the direction of the longitudinal axis X of the aircraft reference trihedron and which constitutes the forward suspension shaft for the engine. The shaft 5 serves to take up the forces acting along the vertical axis Z and the transverse axis Y of the reference trihedron, these forces resulting from the weight of the engine, and from the dynamic forces due to vertical and lateral accelerations caused by vertical and lateral movements of the aircraft. At the rear end of the base support 4 are attached thrust take-up rods 6 and 7 which extend forwardly at an angle to the longitudinal axis X and have their front ends secured laterally to the intermediate casing of the engine. The rods 6, 7 transmit the forces produced by the engine thrust, which acts in the direction of the longitudinal axis X.

In addition to the normal suspension just described, the front suspension system 1 includes an emergency suspension device 10 which operates only in the event of a failure of the normal suspension.

Figure 6:
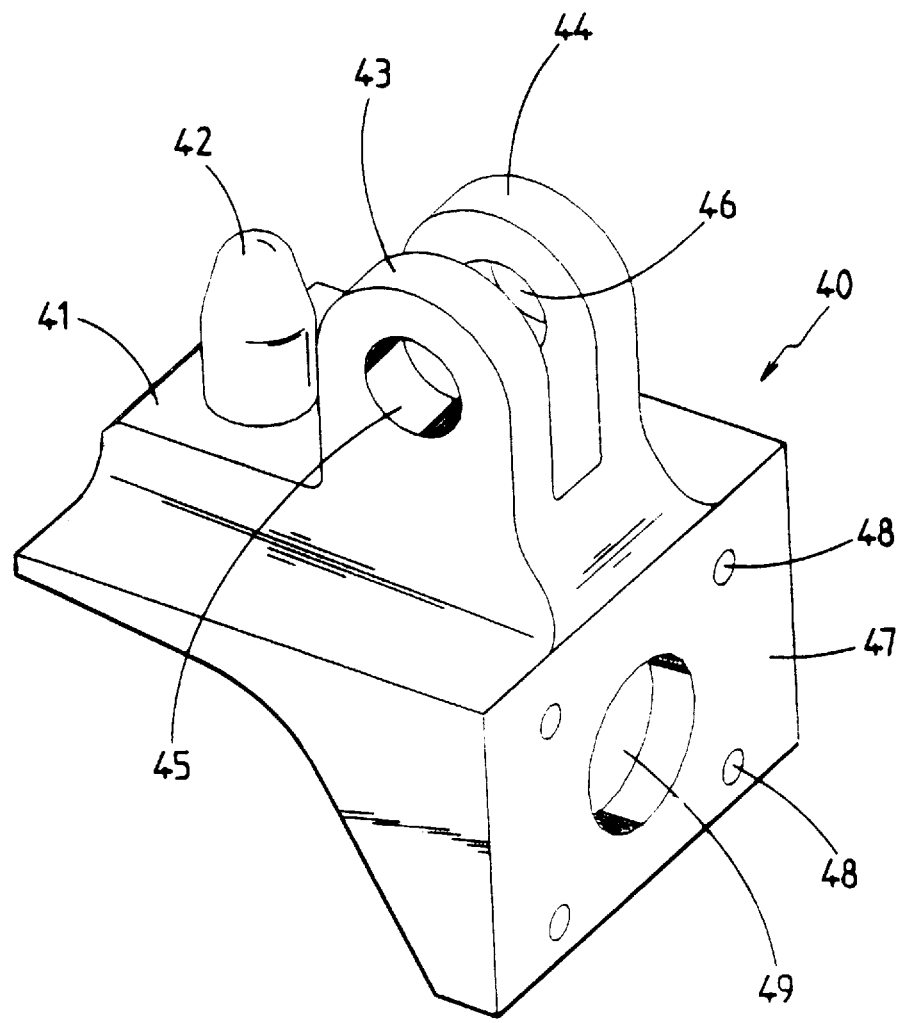
FIG. 6 is a perspective view of just the second support of the emergency suspension device.

The emergency suspension device 10 comprises a first support 20 secured to the pylon 2 and a second support 40 secured to the intermediate casing of the engine. The first support 20 is shown in FIGS. 1, 3, 4 and 5 and the second support 40 is shown in FIGS. 1, 4 and 6.

The device 10 also comprises a first vertical yoke 50 secured to the pylon 2, and a connecting rod 60 which connects the yoke 50 to the second support 40.

In the embodiment shown, the vertical yoke 50 is separate from and disposed above the first support 20, but may be formed integrally with the first support 20 without departing from the scope of the invention. Also, the first support 20 and the heel 3 are integrally formed as a single unitary member in the present embodiment, but may be formed as two separate members disposed one against the other and bolted together.

At its front end the first support 20 has a horizontal yoke 21 provided with a vertical bore 22, and centrally the support 20 has an upstanding vertical plate 25 having holes 26 through which it can be bolted to a front wall 27 of the pylon 2. The plate 25 is provided with a stiffening wall 28 on its front face, and holes 23 are provided in the heel 3 and support 20 for the fixing of the base support 4 of the primary suspension device.

The vertical yoke 50 on the pylon front wall 27 comprises two vertical lugs 51, 52 having coaxial bores. The top end 61 of the connecting rod 60 is located between the lugs 51, 52 and is connected thereto by means of a first transverse pin 53 which extends through the bores and an eye in the end 61 of the rod.

The second support 40 is a unitary member having an upwardly projecting vertical pin 42 near the rear of its top surface 41 and a second vertical yoke projecting upwardly near the front of the top surface 41. The second vertical yoke is formed by two lugs 43, 44 which are spaced apart in planes perpendicular to the Y-axis and are formed with coaxial bores 45, 46. The lower end 64 of the connecting rod 60 is received between the two lugs 43, 44 and is connected thereto by a second transverse pin 62 which extends through the bores 45, 46 and an eye 63 in the lower end 64 of the rod 60. Disposed at the front of the second support 40 is a plate 47 which extends downwardly and is perpendicular to the X-axis. This plate 47 is provided with holes 48 through which the second support 40 can be bolted to the intermediate casing of the engine, and with an aperture 49 for the passage, with a clearance, of the shaft 5 of the base support 4.

The first support 20, the yoke 50, the second support 40 and the connecting rod 60 are so dimensioned that in the event of a failure of the normal suspension, the rod 60 and vertical yokes 50 and 43, 44 can take the Z-axis forces produced by the turboshaft engine, and the horizontal yoke 21 and vertical pin 42 can take the forces and loads produced by the engine along the X and Y-axes.

Figure 7:
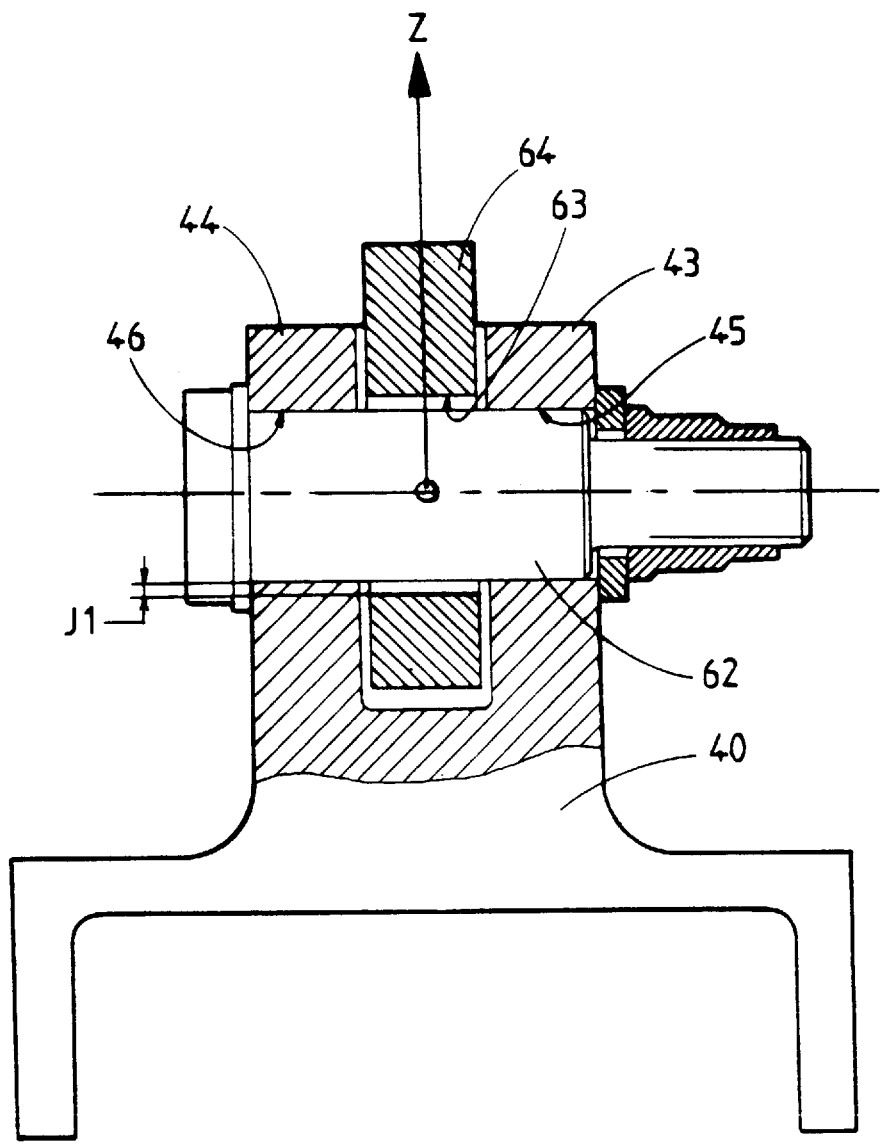
FIG. 7 is a transverse section through the front suspension system shown in FIG. 1 taken in a plane perpendicular to the longitudinal axis X and passing through the axis of the transverse pin interconnecting the rod and the second support of the emergency suspension device.
Figure 8:
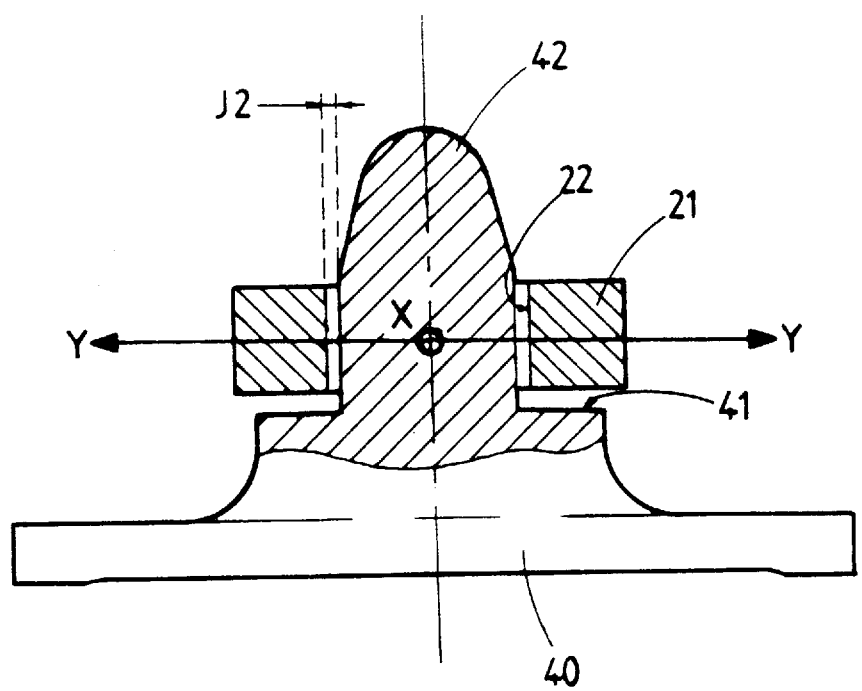
FIG. 8 is a transverse section through the front suspension system shown in FIG. 1, taken in a plane perpendicular to the longitudinal axis X and passing through the axis of the vertical pin of the second support of the emergency suspension device.

When the primary suspension device and the emergency suspension device are correctly fixed to the pylon 2 and the intermediate casing of the turboshaft engine as described earlier, the vertical pin 42 of the second support 40 is located with a clearance J2 in the bore 22 of the horizontal yoke 21 of the first support 20 as shown in FIG. 8. Also, the top surface 41 of the second support 40 is spaced from the bottom surface of the horizontal yoke 21 of the first support 20, and the second support 40 does not touch the base support 4 of the normal suspension provided by the primary suspension device. When the normal suspension is intact and operating under normal conditions, the second support 40 is connected actively neither to the base support 4 nor to the first support 20. Furthermore, as shown in FIG. 7, the dimensions of the bottom end 64 of the connecting rod 60 and of the eye 63 are such that the rod end 64 is disposed with clearance between the lugs 43 and 44 of the second support 40 and the transverse pin 62 extends through the eye 63 with a clearance J1. Provided that there is no failure of the base support 4 or of the thrust take-up rods 6, 7 there is no stressing of the connecting rod 60.

In the event of a failure of the normal suspension because of the rupture of the shaft 5, the Y-axis forces are taken up by the vertical pin 42 and the horizontal yoke 21 of the first support 20 and the Z-axis forces are taken up by the vertical yoke 43, 44 of the second support 40, the transverse pin 62, the connecting rod 60 and the vertical yoke 50 secured to the pylon 2, whereas the X-axis loads continue to be taken up by the rods 6 and 7.

In the event of a rupture of one of the thrust take-up rods 6 and 7, the X-axis loads are taken up by the vertical pin 42 and the horizontal yoke 21 of the first support 20, while the Y and Z-axes forces continue to be taken up by the normal suspension.

Finally, in the event of a rupture of the shaft 5 and either of the rods 6, 7, all the forces and loads are transmitted from the second support 40 to the pylon 2 by way of the first support 20 and the connecting rod 60.

We claim:

1. A redundant front suspension system for a turboshaft engine mounted on a pylon carried by an aircraft, said suspension system comprising a primary suspension device which functions as the normal front suspension of said engine, and an emergency suspension device which operates only in the event of a failure of said normal front suspension, said primary suspension device comprising a base support which is secured to said pylon and is connected to the intermediate casing of said turboshaft engine, and thrust take-up rods which are interposed between said base support and said engine, said base support being adapted to provide mechanical transmission of the forces acting along a transverse axis Y and a vertical axis Z between said intermediate casing and said pylon as well as transmission to said pylon of the engine thrust forces which act along a longitudinal axis X and which are transmitted by said thrust take-up rods, and said emergency suspension device comprising a first support which is fixed to said pylon and has a horizontal yoke adapted to take up the X and Y-axes forces, a first vertical yoke which is fixed to said pylon and is adapted to take-up the Z-axis forces, a second support which is secured to said intermediate casing of said engine and which has a second vertical yoke adapted to take up said Z-axis forces and a vertical pin adapted to take up said X and Y-axis forces, and a connecting rod having a first end connected to said first vertical yoke and a second end connected to said second vertical yoke, the connection between said connecting rod and one of said first and second vertical yokes being provided with a clearance, and said horizontal yoke of said first support having a bore in which said vertical pin of said second support is received with a clearance.

2. A suspension system according to claim 1, wherein said first vertical yoke is disposed above said horizontal yoke of said first support.

3. A suspension system according to claim 1, wherein said first vertical yoke and said first support are dissociated from eachother and are separately fixed to the pylon.

4. A suspension system according to claim 2, wherein said second vertical yoke on said second support is disposed in front of said vertical pin thereof.

5. A suspension system according to claim 4, wherein said second vertical yoke on said second support comprises two lugs which are disposed on opposite sides of said second end of said connecting rod.

6. A suspension system according to claim 5, wherein said two lugs are disposed in front of said horizontal yoke of said first support.

* * * * *